(12) United States Patent
DeRosa et al.

(10) Patent No.: US 6,962,619 B1
(45) Date of Patent: Nov. 8, 2005

(54) AIR DECONTAMINATION SYSTEM

(76) Inventors: Richard DeRosa, 4785 Ranchwood Rd., Akron, OH (US) 44333; Robert Hockenberry, 4026 Traymore Dr., Youngstown, OH (US) 44511

( * ) Notice: Subject to any disclaimer, the term of this patent is extended or adjusted under 35 U.S.C. 154(b) by 0 days.

(21) Appl. No.: 10/875,639

(22) Filed: Jun. 24, 2004

(51) Int. Cl.[7] .......................... B01D 35/14; B01D 35/30

(52) U.S. Cl. ..................... 95/267; 55/385.2; 55/467.1; 55/471; 55/481; 55/485; 55/486; 96/397; 96/417

(58) Field of Search .................. 95/267; 55/385.2, 55/467, 467.1, 471, 481, 485, 486; 96/397, 96/417

(56) References Cited

U.S. PATENT DOCUMENTS 6,383,241 B1 * 5/2002 Janus et al. ................ 55/385.2

OTHER PUBLICATIONS

Web site pages: Americansaferoom.com, Sep. 1, 2004.

* cited by examiner

*Primary Examiner*—Robert A. Hopkins
(74) *Attorney, Agent, or Firm*—Roger D. Emerson; Deron A. Cook; Brouse McDowell (57) ABSTRACT

An air decontamination system that cleans air which has been contaminated by a terrorist attack or other means of contamination. The air is drawn into the system, cleaned through the use of filters, and exits the system into an enclosed area where people have gathered to await passage of the danger. The unit is easily turned on and off via a switch.

17 Claims, 5 Drawing Sheets

AIR DECONTAMINATION SYSTEM

I. BACKGROUND OF THE INVENTION

A. Field of Invention

This invention pertains to the art of methods and apparatuses for filtering, cleaning and purifying air that may have become contaminated due to airborne toxic particulates and specifically, toxic particulates that may originate from a nuclear, biological, chemical or terrorist attack.

B. Description of the Related Art

In recent months since the events of Sep. 11, 2001, there has been increased interest developing tools that will reliably protect people from the after affects of further terrorist attacks.

As a result of attacks around the world, the sense of vulnerability has been heightened. Attacks may come unexpectedly, thus leaving people to scramble for a safe haven. Most recently the threats from biological, chemical, nerve gas and radioactive toxins (comprised of particulates in the 0.3 micron range) have become a real danger. These agents have been widely produced in the past and have been used to carry out countless devastating attacks on groups of people. The present invention relates to apparatuses and methods for providing a safe harbor in a building having an opening, wherein the safe harbor is provided with sufficient purified, decontaminated air to provide a positive pressure system, thereby reducing the risk of contaminants entering into the safe harbor.

It is known in the art for home air filtration systems to be provided during emergency situations involving biological, chemical, nerve or radioactive agents and or particulates. One form of protection is offered in the use of duct tape and plastic sheeting to cover windows and doors to eliminate external outside contaminated air from entering the home. Covering windows with plastic and duct tape, however, is cumbersome and requires a considerable amount of time and energy. Time may not be available if an attack or release of contaminants is unexpected. Windows and doors covered in this fashion are also unsightly and there is much waste generated from this form of protection. It is also known in the art to use gas masks to protect individuals from contaminated air. While gas masks generally work well for their intended purpose, they are burdensome to wear and can only protect one individual at a time. The use of gas masks and plastic sheeting also has the possibility of creating panic in the general public and may result in low levels of safety for the general public.

The present invention provides methods and apparatuses for protecting multiple individuals within any type of dwelling or living space, including houses, office buildings and other enclosures.

II. SUMMARY OF THE INVENTION

The present invention may be installed within an existing opening, such as a window or air conditioner cut out, thereby providing an air decontamination system that is ready during any emergency situation. The unit is practical for every citizen in any type of dwelling to protect themselves and their family from many types of threats. The difficulties inherent in the art are therefore overcome in a way that is simple and efficient, while providing better and more advantageous results.

According to one aspect of the invention, an air decontamination apparatus for use in moving filtered air into an associated enclosed space, the enclosed space having an opening, the apparatus having a housing enclosing an air filtration compartment, wherein the air filtration compartment may have an outlet and an inlet; having at least a first air decontamination filter received within the air filtration compartment, the at least a first air decontamination filter being operatively positioned between the outlet and inlet, wherein the air filtration compartment may be positioned outside the associated enclosed space at the opening; having an air mover operatively communicated to the air filtration compartment for use moving air through the at least a first air decontamination filter; and having a power supply for use in providing power to drive the air mover.

According to another aspect of the invention, the air decontamination apparatus may have an at least a first air decontamination filter that is removably received within the air filtration compartment.

According to a further aspect of the invention, the air decontamination apparatus may include at least a second air decontamination filter received within the air filtration compartment, wherein the at least a second air decontamination filter may remove substantially a different contaminant with respect to the at least a first air decontamination filter.

According to yet another aspect of the invention, the air decontamination apparatus may have an at least a first air decontamination filter selected from the group consisting of HEPA filter, charcoal filter, biological agent filter, chemical agent filter and radioactive agent filter.

According to another aspect of the invention the air decontamination apparatus may include a first inlet seal operatively juxtaposed to the inlet and a first outlet seal operatively juxtaposed to the outlet.

According to yet another aspect of the invention, the housing may include an operations compartment having a bulkhead, wherein the bulkhead may include an air flow passage and wherein the bulkhead may be positioned within the opening of the associated enclosed space and wherein the operations compartment may be positioned inside the associated enclosed space at the opening; and wherein the air filtration compartment may be detachably connected with respect to the bulkhead.

According to a further aspect of the invention the air filtration compartment may be disposable.

According to a further aspect of the invention the air decontamination apparatus may include a backup power supply operatively communicated with the air mover and an activation switch for activating the air decontamination apparatus.

According to another aspect of the invention, the activation switch may be a wireless activation switch.

According to a another aspect of the invention, the air decontamination apparatus may include an air heating element for use in heating the associated filtered air, the air heating element being operatively received within the air decontamination apparatus.

According to a further aspect of the invention, the air decontamination apparatus may include an air cooling element for use in cooling the associated filtered air, the air cooling element being operatively received within the air decontamination apparatus.

According to a another aspect of the invention a method of creating a contaminant free enclosed space is provided, the steps of which may include providing an associated enclosed space for use in housing associated people, wherein the enclosed space may have an opening formed within the walls of the enclosed space; providing an air decontamination apparatus which may include a housing having an air filtration compartment, wherein the air filtration compartment may have an outlet and an inlet, at least a first air decontamination filter received within the air filtration compartment, the at least a first air decontamination filter being operatively positioned between the outlet and inlet, an air mover operatively communicated to the air filtration compartment for use moving air through the at least a first air decontamination filter; and, a power supply for use in providing power to drive the air mover; selectively installing the air decontamination apparatus within the opening of the associated enclosed space; activating the air decontamination apparatus, and producing sufficient air flow from the air decontamination apparatus to provide positive pressure air flow within the associated enclosed space to prevent infiltration of contaminated air into the associated enclosed space from the exterior of the associated enclosed space.

According to a further aspect of the invention, the step of selectively installing the air decontamination apparatus within the opening of the associated enclosed space may include the step of selectively installing the air decontamination apparatus within the opening of the associated enclosed space wherein the air filtration compartment is positioned exterior to the associated enclosed space.

According to yet another aspect of the invention, the step of selectively installing the air decontamination apparatus within the opening of the associated enclosed space wherein the air filtration compartment is positioned exterior to the associated enclosed space may include the step of selectively installing the air decontamination apparatus within the opening of the associated enclosed space wherein the air filtration compartment is positioned exterior to the associated enclosed space and wherein the air mover is positioned interior to the associated enclosed space.

According to yet another aspect of the invention, the step of providing an air decontamination apparatus may further include providing a selectively variable activation switch for use in varying the air flow output from the air mover, and the step may further comprise varying the air flow output of the air decontamination apparatus respective to the volume of the associated enclosed space.

According to another aspect of the invention, the step of activating the air decontamination apparatus may comprise the step of remotely activating the air decontamination apparatus.

According to another aspect of the invention, the step of remotely activating the air decontamination apparatus may comprise the step of wirelessly remotely activating the air decontamination apparatus.

According to another aspect of the invention, the step of providing an air decontamination apparatus, may further include providing an activation switch for use in activating the air decontamination apparatus, and a sensor for use in automatically detecting at least a first contaminant, wherein the sensor is operatively communicated to the activation switch; and, may additionally include the step of automatically activating the air decontamination apparatus.

III. BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

IV. DESCRIPTION OF THE PREFERRED EMBODIMENT

Figure 1:
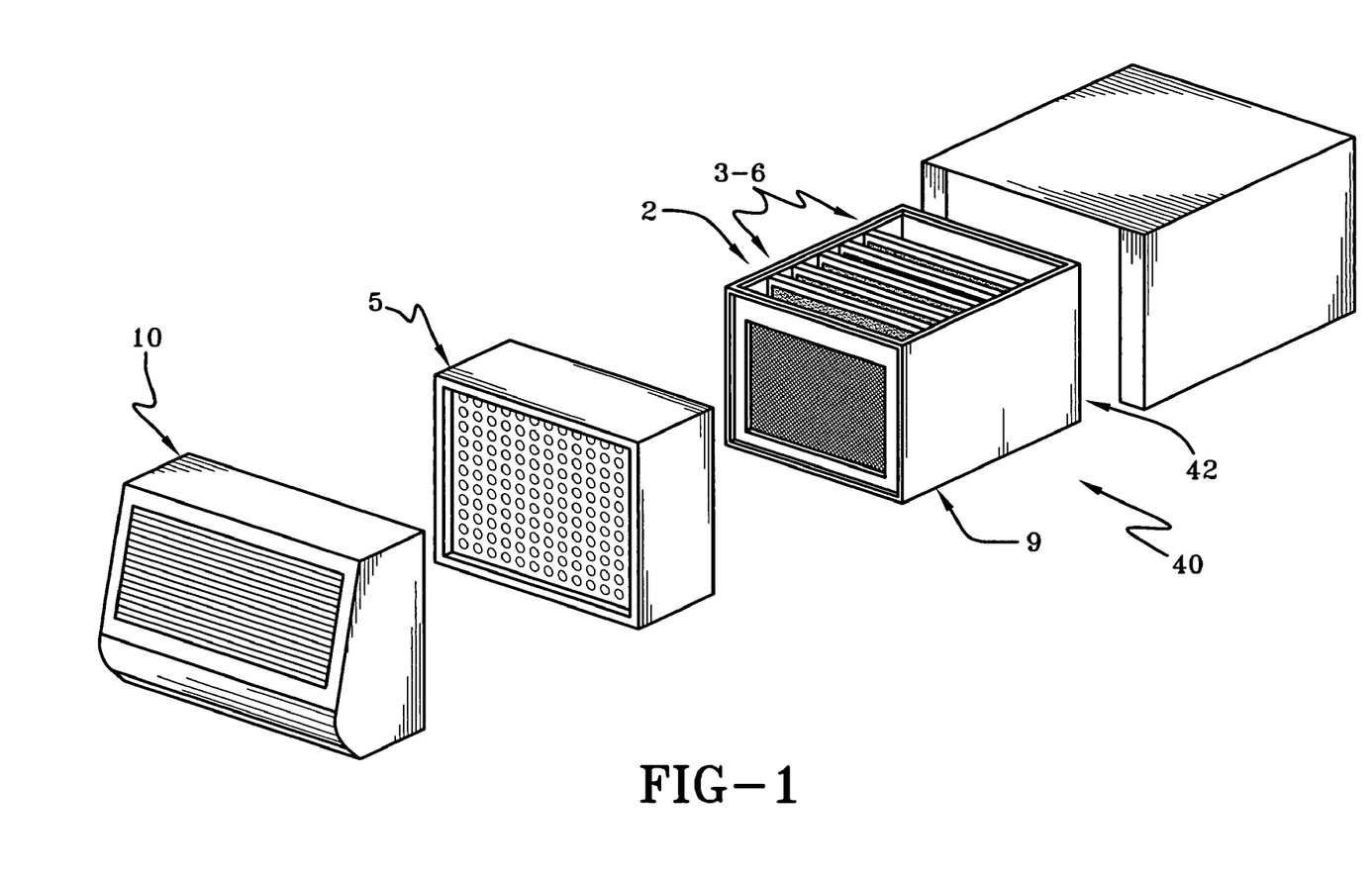
FIG. 1 is an exploded view of one embodiment of the air unit.
Figure 2:
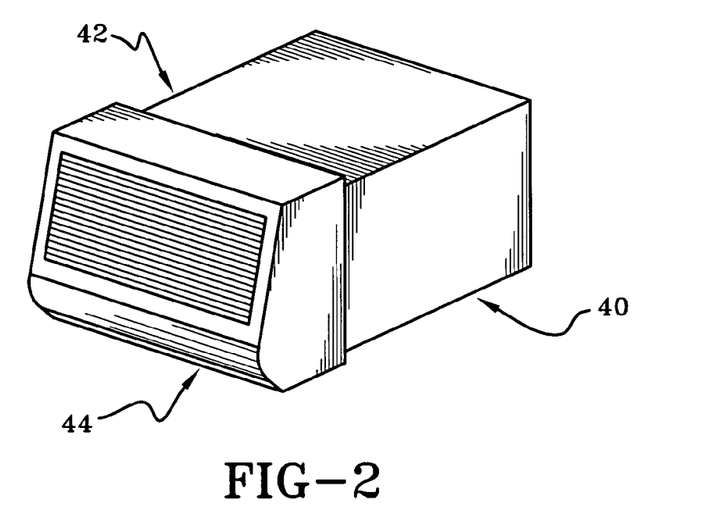
FIG. 2 is a perspective view of one embodiment of the assembled air purification unit.
Figure 3:
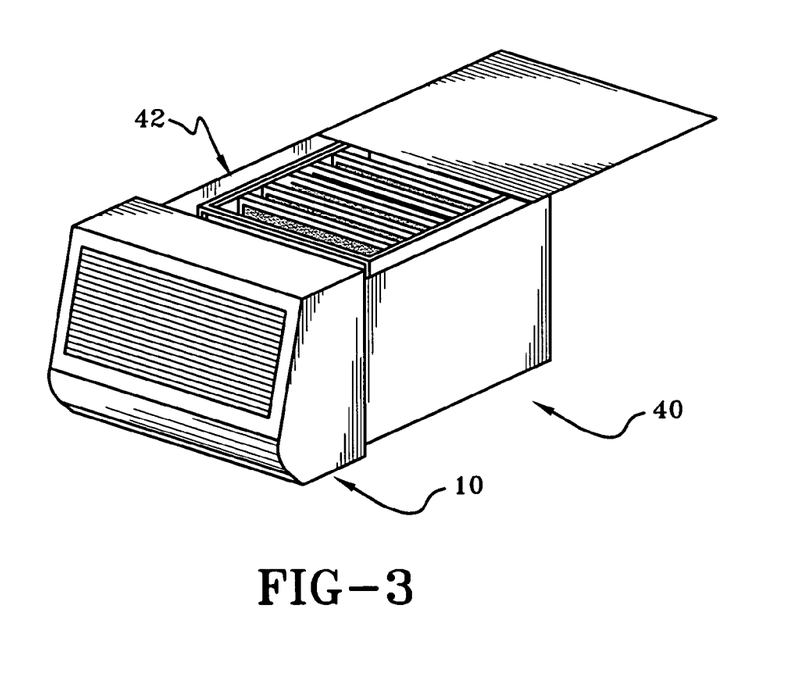
FIG. 3 is another perspective view of one embodiment of the assembled air decontamination unit.

Referring now to the drawings wherein the showings are for purposes of illustrating a preferred embodiment of the invention only and not for purposes of limiting the same, FIG. 1 shows an exploded view of the air decontamination unit shown generally at 40. The air decontaminations unit 40 may be a stand alone unit that provides continuous air decontamination. The term "stand alone unit" refers to a unit that is self-contained and that may independently operate without requiring external devices or components, such as air intake hoses. The air decontamination unit 40 may be a stand alone unit even though the filters 2–6 (discussed below) may be removable or replaceable.

The air decontamination unit 40 has an air filtration compartment 42 and may also have an air mover 5 (discussed below). The air decontamination unit 40 may also have an operations compartment 10. The operations compartment 10 will be discussed in detail below.

Figure 5:
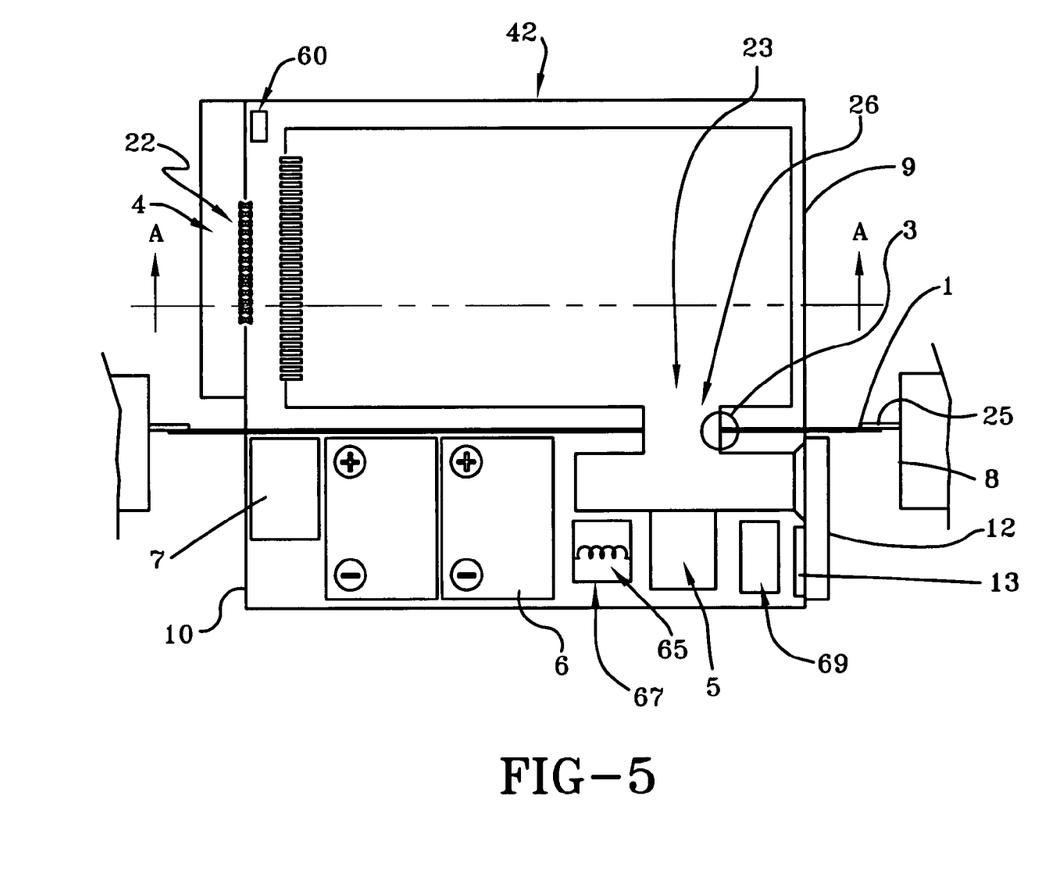
FIG. 5 is a perspective view of the inventive air purification unit.

With continued reference to FIG. 1 and as shown in FIG. 5, the air filtration compartment 42 of the air decontamination unit 40 may consist of a housing 9. In one embodiment, the housing 9 may have an inlet 22 that allows sufficient air to enter into the housing 9. The term "sufficient" means a volume of air that is capable of producing positive pressure in the associated enclosed space when the air decontamination unit 40 is being operated. The inlet 22 may be a single opening or it may be a series of openings, such as in a grate. The inlet 22 may be any opening or combination of openings that allows sufficient air to enter the housing 9. The housing 9 may also have an outlet 23 for allowing air to flow from the housing into the associated enclosed space. The outlet 23 may be a single opening or it may be a series of openings, such as in a grate. The outlet 23 may be any opening or combination of openings that allows sufficient air to exit the housing 9.

The air filtration compartment 42 is adapted to receive an air decontamination filter 2. The air decontamination filter 2 may be received with respect to the housing 9 between the inlet 22 and the outlet 23. In one embodiment, the air decontamination filter 2 may be fully contained within the housing 9. In an alternate embodiment, the air decontamination filter 2 may extend beyond at least one wall of the housing 9. The air decontamination filter 2 may be fixedly received with respect to the housing 9. In an alternate embodiment, the air decontamination filter 2 may by removably received with respect to the housing 9. In this way, air decontamination filter 2 may be removed and replaced with another filter.

In one embodiment, the air filtration compartment 42 may be adapted to receive a plurality of filters 3–6. Each of the plurality of filters 3–6 may remove substantially a different contaminant from the air. Each of the plurality of filter 3–6 may remove substantially the same contaminant, but filter out different sized contaminants. In an alternate embodiment the plurality of filters 3–6 may be selected to filter out specific combinations of contaminants. The plurality of filters 3–6 may be selected to provide the ability to remove specific contaminants that are likely to be present in the air due to the surrounding landscape, business facilities or potential terrorist targets. It should be understood that any number of filters 2–6 and any combination of filters may be used as chosen with sound engineering judgment. The filters 2–6 may be charcoal filters, or high-efficiency particulate air ("HEPA") filters or any other type of filter that will filter out toxic contaminants, including contaminant agents that are biological or chemical in nature, such as anthrax, hydrogen cyanide, asbestos and sarin gas, or radioactive, such as radioactive agents that might be released as a result of a "dirty bomb".

Figure 4:
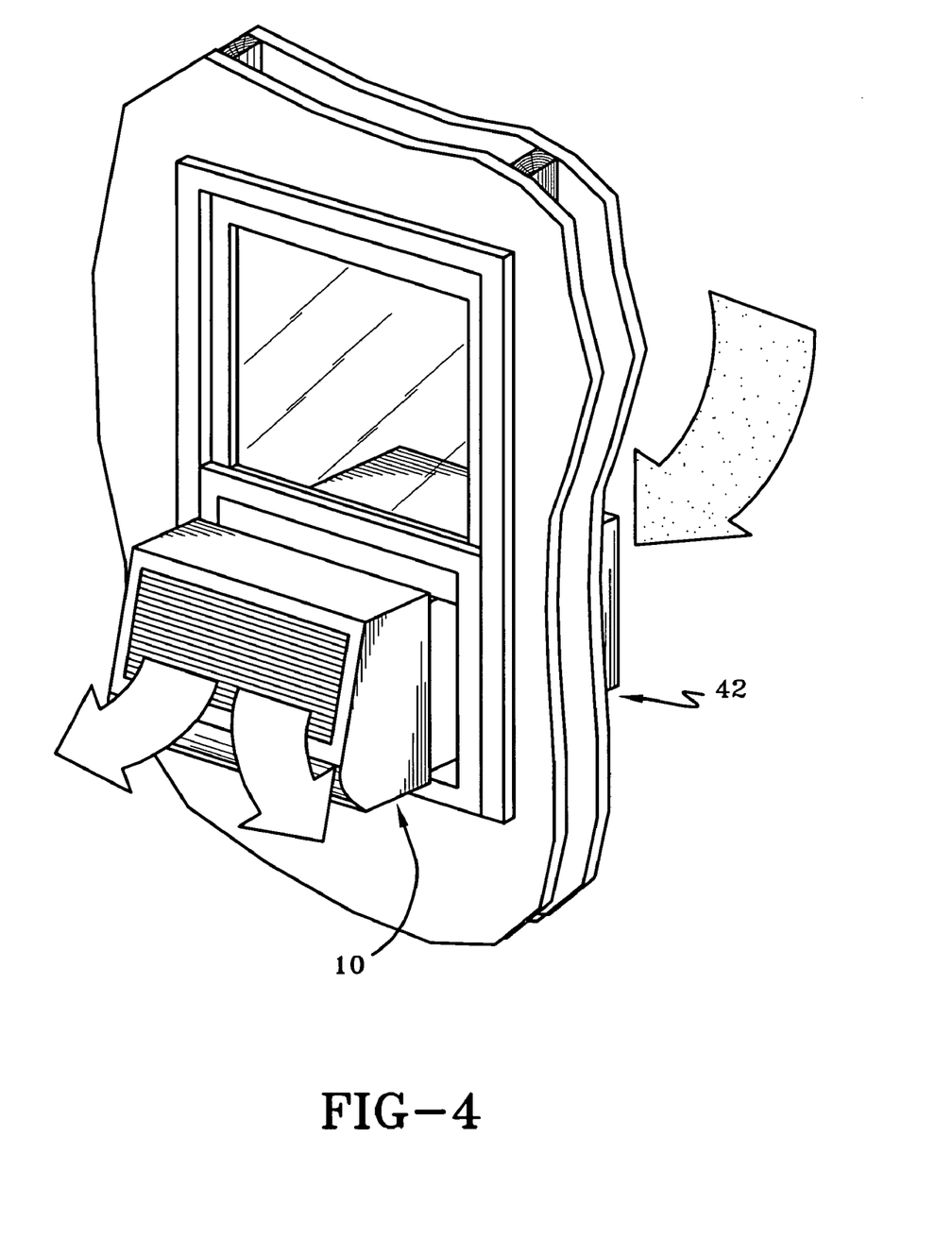
FIG. 4 is a perspective and side view of one embodiment of the air decontamination unit installed in a window showing the path of airflow.

As shown in FIG. 4, the air filtration compartment 42 may be positioned outside the associated enclosed space at an opening in the enclosed space. The opening may be an existing window opening or an opening vacated by a window-type air conditioning unit. The opening may also be added to the enclosed space for the air filtration compartment to be received 42. In one embodiment, the opening may extend to the exterior of the building containing the enclosed space. In an alternate embodiment, the opening may extend into another interior space in the associated building containing the enclosed space. The opening preferably extends into an area that has sufficient air that can be drawn into the inlet 22 of the air filtration compartment 42.

As indicated above, the air filtration compartment 42 may be positioned outside the enclosed space at an opening in the enclosed space. This embodiment is preferable because it keeps the inlet 22 and the filters 2–6 outside the enclosed space. In an alternate embodiment, at least a portion of the air filtration compartment 42 may extend inside the enclosed space. In this embodiment, the inlet 22 may remain outside the enclosed space so as to provide an inlet for air from outside the enclosed space; however, the filters 2–6 may be inside or partially inside the enclosed space or, alternatively, the inlet 22 and filters 2–6 may remain outside the enclosed space while the outlet remains inside the enclosed space.

As shown in FIG. 5, the air filtration compartment 42 may include a cover 4 positioned with respect to the inlet to substantially prevent rain, snow, and other debris from entering into the inlet 22 and potentially clogging the inlet or damaging the filters 2–6.

Figure 6:
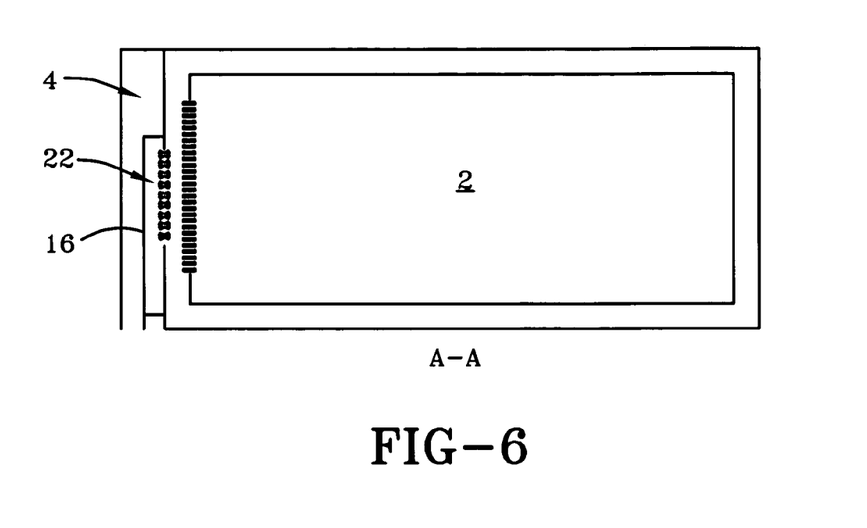
FIG. 6 is a view of the air decontamination unit taken along Section Line A—A of FIG. 5.
Figure 7:
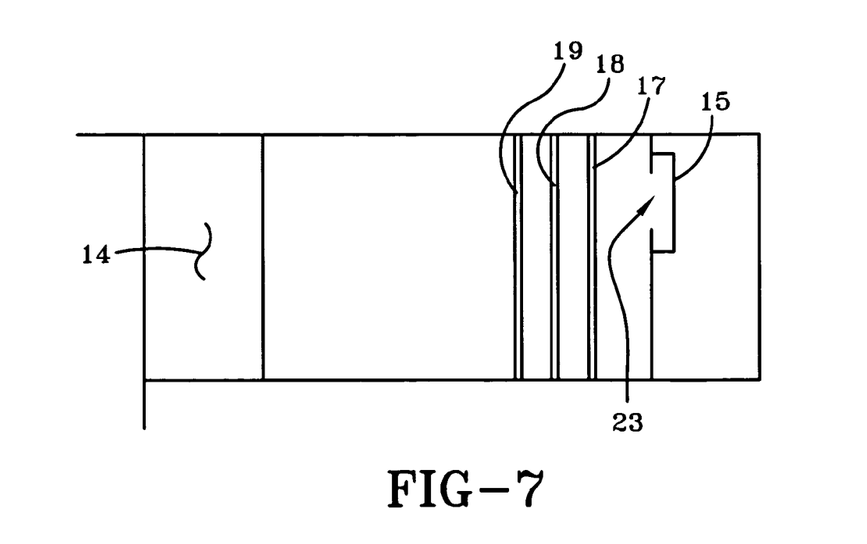
FIG. 7 is a front view of the air decontamination unit.

As shown in FIGS. 5–7, the air filtration compartment 42 may include an inlet seal 16. The inlet seal 16 may be juxtaposed to the inlet 22. The inlet seal 16 may provide an air tight seal to prevent air from passing through the inlet 22 into the filters 2–6. The inlet seal 16 may also help to protect the interior of the air filtration compartment 42 from debris and weather such as snow or rain. The inlet seal 16 may be a plastic seal that fits over the inlet 22. In an alternate embodiment, the first inlet seal 16 may be a plate that covers the inlet 22. The inlet seal 16 may be metal or rubber or plastic or any material selected with sound engineering judgment. The inlet seal 16 in combination with an outlet seal 15 (discussed below and shown in FIG. 7) may provide an airtight region around the filters 2–6, which may extend the life of the filters 2–6, especially where one or more of the filters 2–6 is a charcoal filter. When the air decontamination unit 40 is not in use, the inlet seal 16 and outlet seal 15 may be in the closed or sealed position.

With continued reference to FIGS. 5–7, the air filtration compartment 42 may include a outlet seal 15. The outlet seal 15 may be operatively juxtaposed to the outlet 23. The outlet seal 15 may provide an air tight seal to prevent air from passing through the outlet 23 into the filters 2–6. The outlet seal 15 may also help to protect the interior of the air filtration compartment 42 from debris that might exist in the enclosed space. The outlet seal 15 may be a plastic seal that fits over the outlet 23. In an alternate embodiment, the outlet seal 15 may be a plate that covers the outlet 23. The outlet seal 15 may be metal or rubber or plastic. The outlet seal 15 may be any shape or material selected with sound engineering judgment.

The inlet seal 16 and the outlet seal 15 may need to be unsealed in order to operate the air decontamination unit 40. The inlet seal 16 and outlet seal 15 may be manually unsealed or mechanically unsealed. The inlet seal 16 and the outlet seal 15 may be unsealed manually by the associated operator tearing them or removing them or mechanically, by the associated operator pulling a lever that is operatively connected to the inlet and outlet seals (16, 15) or activating a motor (not shown) that unseals the inlet and outlet seals (16, 15). In this latter embodiment, the motor may be operatively connected to the inlet and outlet seals (16, 15) through a pivot arm or other appendage. Upon activation of the motor the pivot arm may swing the inlet and outlet seals (16, 15) open. The inlet seal 16 and the outlet seal 15 may be unsealed by any means selected with sound engineering judgment.

As shown in FIG. 5, the air decontamination unit may be provided with a bulkhead 1. The bulkhead 1 may be a wall of the air filtration compartment 42. The bulkhead may be a wall of the operations compartment 44. The bulkhead 1 may be a joint wall between the air filtration compartment 42 and the operations compartment 44. The bulkhead 1 may be a separate component from the air filtration compartment 42 and the operations compartment 44. The bulkhead 1 may be placed inside the opening of the enclosed space. The bulkhead 1 may substantially extend from one edge of the opening to the other edge and from the top of the opening to the bottom of the opening in order to provide a substantially air tight seal between the opening and the edges of the bulkhead 1. In one embodiment, the bulkhead 1 may be provided with a bulkhead seal 8 that may be placed between the opening and the edges of the bulkhead 1. The bulkhead seal 8 may be rubber or plastic or any other material selected with sound engineering judgment. Spacers, gaskets, packing, o-rings, or any other type of material that creates an air-tight seal may be used as chosen with sound engineering judgment. The bulkhead 1 may also be provided with attaching means for attaching the bulkhead 1 within the opening. The bulkhead 1 may be adjustable to fit within different sized or shaped openings. In one embodiment, the bulkhead 1 may have wings 25 that adjustably extend from the edges of the bulkhead 1 to extend or contract the area of the bulkhead 1. it is noted that in practical application, there may be gaps between the bullhead 1 and the opening, such as where there is a leak in the seal. It is contemplated that the air decontamination unit 40 may produce sufficient purified air into the enclosed space to create a positive pressure environment so the air will be forced out through the gaps after the air decontamination unit 40 is activated.

The bulkhead 1 may be provided with an airflow passage 26. The airflow passage 26 may be adapted to receive the outlet 23. The airflow passage 26 may be the same as the outlet 23. The airflow passage 26 may be of any size which permits sufficient air to flow through the outlet 23 into the enclosed space. In one embodiment, the only air that passes through the airflow passage 26 is air that has previously passed through the filters 2–6. Surrounding the airflow passage 26 between the bulkhead 1 and the air filtration compartment 42, there may be an airflow passage seal 3 which creates an airtight region around the air flow passage 26 to prevent air from leaking into the airflow passage 26 through a gap between the bulkhead 1 and the air filtrations compartment 42. The first outlet seal 15 may, in an alternate embodiment, be juxtaposed adjacent the airflow passage 26.

The air filtration compartment 42 may be permanently connected to the bulkhead 1 so that the outlet 15 and the airflow passage 26 are substantially aligned alternatively. The air filtration compartment 42 may be detachably connected to the bulkhead 1. In this embodiment, the air filtration compartment 42 may be removed from the bulkhead 1 and disposed of. In this manner, the filters 2–6 may be disposed of separately.

As shown in FIG. 1, the air decontamination unit 40 may have an air mover 5. The air mover 5 may be a fan or a blower. The air mover 5 may be any apparatus that is capable of moving sufficient air through the air flow passage 26. The air mover 5 may draw air into the air decontamination unit 40 through the inlet 16 and out the air flow passage 26. Alternatively, the air mover 5 may push air through the air decontamination unit 40 and out the air flow passage 26. The air mover 5 may be located adjacent the inlet 16 or outlet 15 on the exterior of the enclosed space or the air mover 5 may be located on the interior of the enclosed space adjacent the airflow passage 26. The air mover 5 may be located adjacent any component of the air decontamination unit 40 where the air mover 5 can move sufficient air through the inlet 16, then through the filters 2–6, then through the outlet 15 and then through the air flow passage 26 into the enclosed space. The air mover 5 may be operatively communicated to an activation switch 13 for turning on the air mover 5. The activation switch 13 may be a variably adjustable activation switch 13 for selectively varying the amount of air drawn or blown by the air mover 5. The variably adjustable activation switch 13 may vary the speed of the air move 5. The activation switch 13 may be a wireless activation switch. In one embodiment, the wireless activation switch may be activated wirelessly by a phone or pager system. In an alternated embodiment, the wireless activation switch may be activated by a signal emanating from the federal, state or local authorities via radio or television signal or other emergency signal.

The activation switch 13 may be operatively communicated with the inlet seal 16 and outlet seal 15. In this way, when the activation switch 13 is activated, the activation switch 13 may communicate with the motor that unseals the inlet seal 16 and outlet seal 15.

The air decontamination unit 40 may be powered by a power supply 7, which may be an AC power supply. The air decontamination unit 40 may have a back-up power supply 6 to supply power to the air decontamination unit 40 in the event that the power supply 7 is lost. The back-up power supply 6 may be a battery. The back-up power supply 6 may be a generator or any other supply of power selected with sound engineering judgment. The power supply 7 and the backup power supply 6 may be located in the operations compartment 44.

As indicated above, the operations compartment 44 may house the power supply 7 and the back-up power supply 6. In one embodiment, the operations compartment 44 may house the activation switch 13. The operations compartment 44 may include a "Power On" display 18 that notifies the user when the air mover 5 is activated. The operations compartment 44 may include a system "OK" display 19 that notifies the user that the air decontamination unit 40 is functioning properly and that there are no internal malfunctions. The operations compartment 44 may include a "Hermetic seal open warning display" 17. The "Hermetic seal open warning display" 17 may notify the associated user when there is a malfunction of the outlet seal 15, inlet seal 16, airflow passage seal 3 or bulkhead seal 8. It is particularly important that malfunctions of the outlet seal 15 or inlet seal 16 be detected when a charcoal filter is incorporated in the air filtration compartment 42 and the airtight nature of the air filtration compartment 42 needs to be maintained. The displays 17, 18 and 19 may be visual displays, such as lights or LCD displays. They may be audible displays or any combination of audible and visual display selected with sound engineering judgment. The displays 17, 18, and 19 and the activation switch 13 may be located any where on the air decontamination unit 40 where accessible to the associated user.

In reference to FIGS. 1–5, the air decontamination unit 40 may include a contaminant sensor 60. The contaminant sensor 60 may sense the presence of contaminants outside the enclosed space or inside the enclosed space or both. The contaminant sensor 60 may be operatively communicated to the activation switch 13. In this way, when the contaminant sensor 60 senses a contaminant, the activation switch 13 may be activated automatically.

In one embodiment, the air decontamination unit 40 may include an air heating element 65 for use in heating the associated filtered air prior to the air entering the enclosed space. The air heating element 65 may be electric heating element or a gas operated heating element. In this embodiment, the air decontamination unit 40 may also include a heat exchanger 67 allowing exhaust gas to be removed from the room. The air decontamination unit 40 may include an air cooling element 69 for use in cooling the associated filtered air prior to the air entering the enclosed space.

With reference now to FIGS. 4–7, the method of use will be described. In one embodiment, the air decontamination unit 40 may be mounted into an opening in the enclosed space. The air decontamination unit 40 may be positioned with the bulkhead 1 within the opening. In an alternate embodiment, the bulkhead 1 may be placed flush to the interior or exterior wall of the opening. The air decontamination unit 40 may be positioned so that the inlet 16 and air filtration compartment 42 is located outside the enclosed space. The air decontamination unit 40 may be affixed in the opening by any means selected with sound engineering judgment. On notification of an event, an event being any release of a contaminant, the air decontamination unit 40 may be activated by the activation switch 13. The inlet and outlet seals (16, 15) may be unsealed. The air mover 5 may be activated, thereby powering the air mover 5 to draw or blow air through the air decontamination unit 40. The airflow path will now be described. Contaminated air may be drawn or blown by the air mover 5 through the inlet 22. The contaminated air then passes through the filters 2–6. The air is decontaminated by the filters and is now purified. The purified air passes through the outlet 23 and airflow passage 26. The purified air is then deposited into the enclosed space. Sufficient purified air is deposited into the enclosed space to provide a positive pressure in the enclosed space. In this way, purified air is allowed to escape out through all openings or gaps in the enclosed space. This prevents contaminated air from entering into the enclosed space through any such openings or gaps.

Once the danger of the event has passed and exterior air is safely breathable, the air decontamination unit 40 may be turned off it also may be turned off automatically. The outlet seal 15 may be sealed to prevent dislodged contaminants from inadvertently passing through the outlet 23 into the enclosed space while the filters 2–6 are being disposed of. The filters 2–6 may be discarded by removing them from the air filtration compartment 42. In this embodiment, replacement filters may be installed. In an alternate embodiment, the air filtration compartment 42 may be removed from the bulkhead 1 and disposed of entirely. In this embodiment, a replacement air filtration compartment may be installed. The air decontamination unit 40 may include an auto bagger that automatically moves the used filters 2–6 into a storage bag for easy disposal.

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. An air decontamination apparatus for use in moving filtered air into an associated enclosed space, the enclosed space having an opening, the apparatus comprising:
    a housing having an air filtration compartment, wherein the air filtration compartment has an outlet and an inlet;
    at least a first air decontamination filter received within the air filtration compartment, the at least a first air decontamination filter being operatively positioned between the outlet and inlet, wherein the air filtration compartment is positioned outside the associated enclosed space at the opening;
    an air mover operatively communicated to the air filtration compartment for use moving air through the at least a first air decontamination filter; and
    a power supply for use in providing power to drive the air mover.

2. The air decontamination apparatus of claim 1 wherein the at least a first air decontamination filter is removably received within the air filtration compartment.

3. The air decontamination apparatus of claim 2, further comprising:
    at least a second air decontamination filter received within the air filtration compartment, wherein the at least a second air decontamination filter removes substantially a different contaminant with respect to the at least a first air decontamination filter.

4. The air decontamination apparatus of claim 2 wherein the at least a first air decontamination filter is selected from the group consisting of:
    HEPA filter, charcoal filter, biological agent filter, chemical agent filter and radioactive agent filter.

5. The air decontamination apparatus of claim 3, further comprising:
    a first inlet seal operatively juxtaposed to the inlet; and,
    a first outlet seal operatively juxtaposed to the outlet.

6. The air decontamination apparatus of claim 1, wherein the housing further comprises:
    an operations compartment having a bulkhead, wherein the bulkhead includes an air flow passage;
    wherein the bulkhead positioned within the opening of the associated enclosed space;
    wherein the operations compartment is positioned inside the associated enclosed space at the opening; and,
    wherein the air filtration compartment is detachably connected with respect to the bulkhead.

7. The air decontamination apparatus of claim 6, wherein the air filtration compartment is disposable.

8. The air decontamination apparatus of claim 6, further comprising:
    a backup power supply operatively communicated with the air mover; and,
    an activation switch for activating the air decontamination apparatus.

9. The air decontamination apparatus of claim 8, wherein the activation switch is a wireless activation switch.

10. The air decontamination apparatus of claim 1, further comprising:
    an air heating element for use in heating the associated filtered air, the air heating element being operatively received within the air decontamination apparatus.

11. The air decontamination apparatus of claim 1, further comprising:
    an air cooling element for use in cooling the associated filtered air, the air cooling element being operatively received within the air decontamination apparatus.

12. A method of creating a contaminant free enclosed space, the steps comprising:
    providing an associated enclosed space for use in housing associated people, wherein the enclosed space has an opening formed within the walls of the enclosed space;
    providing an air decontamination apparatus including:
        a housing having an air filtration compartment, wherein the air filtration compartment has an outlet and an inlet;
        at least a first air decontamination filter received within the air filtration compartment, the at least a first air decontamination filter being operatively positioned between the outlet and inlet;
        an air mover operatively communicated to the air filtration compartment for use moving air through the at least a first air decontamination filter; and,
        a power supply for use in providing power to drive the air mover;
    selectively installing the air decontamination apparatus within the opening of the associated enclosed space;
    wherein the air filtration compartment is positioned exterior to the associated enclosed space;
    activating the air decontamination apparatus; and,
    producing sufficient air flow from the air decontamination apparatus to provide positive pressure air flow within the associated enclosed space to prevent infiltration of contaminated air into the associated enclosed space from the exterior of the associated enclosed space.

13. The method of claim 12, wherein the step of selectively installing the air decontamination apparatus within the opening of the associated enclosed space wherein the air filtration compartment is positioned exterior to the associated enclosed space, comprises the step of:
    selectively installing the air decontamination apparatus within the opening of the associated enclosed space wherein the air filtration compartment is positioned exterior to the associated enclosed space and wherein the air mover is positioned interior to the associated enclosed space.

14. The method of claim 13, wherein the step of providing an air decontamination apparatus, further includes:
    a selectively variable activation switch for use in varying the air flow output from the air mover; and,
    the step further comprising:
    varying the air flow output of the air decontamination apparatus respective to the volume of the associated enclosed space.

15. The method of claim 13, wherein the step of activating the air decontamination apparatus, comprises the step of:
- remotely activating the air decontamination apparatus.

16. The method of claim 14, wherein the step of remotely activating the air decontamination apparatus, comprises the step of:
- wirelessly remotely activating the air decontamination apparatus.

17. The method of claim 13, wherein the step of providing an air decontamination apparatus, further includes:

an activation switch for use in activating the air decontamination apparatus; and, a sensor for use in automatically detecting at least a first contaminant, wherein the sensor is operatively communicated to the activation switch; and, further comprising the step of:

automatically activating the air decontamination apparatus.

* * * * *